(12) United States Patent
Yokota et al.

(10) Patent No.: US 8,644,784 B2
(45) Date of Patent: Feb. 4, 2014

(54) TERMINAL APPARATUS AND DIVERSITY ANTENNA CONTROL METHOD FOR THE SAME

(75) Inventors: Koichi Yokota, Kawasaki (JP); Isamu Yamada, Kawasaki (JP); Shinichi Shiotsu, Kawasaki (JP); Akira Itasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1177 days.

(21) Appl. No.: 12/382,746

(22) Filed: Mar. 23, 2009

(65) Prior Publication Data

US 2009/0325528 A1    Dec. 31, 2009

(30) Foreign Application Priority Data

Jun. 26, 2008   (JP) .................................. 2008-167390

(51) Int. Cl.
   *H04B 1/06*     (2006.01)
(52) U.S. Cl.
   USPC ...................................................... 455/277.1
(58) Field of Classification Search
   USPC ...................................................... 455/277.1
   See application file for complete search history.

(56) References Cited

U.S. PATENT DOCUMENTS 7,221,963 B2 *   5/2007   Ishihara et al. ............ 455/562.1
7,272,372 B2     9/2007   Kasami et al.

FOREIGN PATENT DOCUMENTS

| EP | 1 806 907 | 7/2007 |
|---|---|---|
| JP | 61-200702 | 9/1986 |
| JP | 11-150490 | 6/1999 |
| JP | 2004-179921 | 6/2004 |
| JP | 2004-260563 | 9/2004 |
| JP | 2005-130175 | 5/2005 |
| JP | 2005-142866 | 6/2005 |
| JP | 2006-245801 | 9/2006 |
| JP | 2007-235305 | 9/2007 |
| JP | 2008-118625 | 5/2008 |
| WO | 2006/046714 | 5/2006 |
| WO | 2007/026819 | 3/2007 |

OTHER PUBLICATIONS

European Search Report dated Oct. 1, 2009 corresponding to International Application No. 09155638.1-1246.
Japanese Office Action mailed Jul. 3, 2012 issued in corresponding Japanese Patent Application No. 2008-167390.
Japanese Office Action mailed Apr. 17, 2012 issued in corresponding Japanese Patent Application No. 2008-167390.

* cited by examiner

*Primary Examiner* — Daniel Rojas
(74) *Attorney, Agent, or Firm* — Staas & Halsey LLP

(57) ABSTRACT

A terminal apparatus adapted to receive a wireless signal by antenna diversity, wherein provisions are made to reduce the number of receive circuits while also reducing the time required for antenna selection. The a terminal apparatus is adapted to receive a wireless signal by antenna diversity, and includes: a mode-of-use detection unit for detecting the mode of use of the terminal apparatus as set up by a user; a storage unit for storing priority information that predefines an antenna to be selected for use by prioritizing the plurality of antennas according to the mode of use that can be detected by the mode-of-use detection unit; and a comparator for outputting selection control information specifying at least one antenna from among the plurality of antennas by comparing the mode of use detected by the mode-of-use detection unit with the priority information stored in the storage unit.

18 Claims, 15 Drawing Sheets

VIEW DIRECTLY
FROM ABOVE

VIEW STRAIGHT
FROM SIDE

FIG.7

| USER SETTING (PREFERENTIAL IF) | CONTACT SENSORS | | | | TILT SENSOR | | | ANTENNAS (PRIORITY IN PARENTHESES) | | | |
|---|---|---|---|---|---|---|---|---|---|---|---|
| | S1 | S2 | S3 | S4 | ax | ay | $|ax| \geq d$ | A1 | A2 | A3 | A4 |
| UMTS | NOT DETECTED | DETECTED | DETECTED | NOT DETECTED | POSITIVE | POSITIVE | Yes | UMTS(1) | NOT SELECTED (3) | NOT SELECTED (4) | WLAN(2) |
| UMTS | DETECTED | NOT DETECTED | DETECTED | NOT DETECTED | POSITIVE | POSITIVE | Yes | NOT SELECTED (3) | UMTS(1) | NOT SELECTED (4) | WLAN(2) |
| UMTS | DETECTED | NOT DETECTED | DETECTED | NOT DETECTED | NEGATIVE | NEGATIVE | Yes | NOT SELECTED (4) | WLAN(2) | NOT SELECTED (3) | UMTS(1) |
| UMTS | DETECTED | DETECTED | NOT DETECTED | DETECTED | POSITIVE | NEGATIVE | No | WLAN(2) | NOT SELECTED (4) | UMTS(1) | NOT SELECTED (3) |
| WLAN | DETECTED | NOT DETECTED | NOT DETECTED | NOT DETECTED | NEGATIVE | POSITIVE | Yes | NOT SELECTED (4) | NOT SELECTED (3) | WLAN(1) | UMTS(2) |
| ⋮ | ⋮ | ⋮ | ⋮ | ⋮ | ⋮ | ⋮ | ⋮ | ⋮ | ⋮ | ⋮ | ⋮ |

| CONTACT SENSORS | | | | TILT SENSOR | | | ANTENNAS (PRIORITY IN PARENTHESES) | | | |
|---|---|---|---|---|---|---|---|---|---|---|
| S1 | S2 | S3 | S4 | ax | ay | \|ax\|≧d | A1 | A2 | A3 | A4 |
| NOT DETECTED | DETECTED | DETECTED | NOT DETECTED | POSITIVE | POSITIVE | Yes | MAIN (1) | NOT SELECTED (3) | NOT SELECTED (4) | SUB (2) |
| DETECTED | NOT DETECTED | DETECTED | NOT DETECTED | POSITIVE | POSITIVE | Yes | NOT SELECTED (3) | MAIN (1) | NOT SELECTED (4) | SUB (2) |
| DETECTED | NOT DETECTED | DETECTED | NOT DETECTED | NEGATIVE | NEGATIVE | Yes | NOT SELECTED (4) | SUB (2) | NOT SELECTED (3) | MAIN (1) |
| DETECTED | DETECTED | NOT DETECTED | DETECTED | POSITIVE | NEGATIVE | No | SUB (2) | NOT SELECTED (4) | MAIN (1) | NOT SELECTED (3) |
| DETECTED | NOT DETECTED | NOT DETECTED | DETECTED | NEGATIVE | POSITIVE | Yes | NOT SELECTED (4) | NOT SELECTED (3) | MAIN (1) | SUB (2) |
| ⋮ | ⋮ | ⋮ | ⋮ | ⋮ | ⋮ | ⋮ | ⋮ | ⋮ | ⋮ | ⋮ |

FIG.14

| LCD ROTATION INFORMATION | ANTENNAS (PRIORITY IN PARENTHESES) | | | |
|---|---|---|---|---|
| | A1 | A2 | A3 | A4 |
| NOTEBOOK | MAIN (1) | SUB (2) | NOT SELECTED (3) | NOT SELECTED (4) |
| TABLET | NOT SELECTED (3) | NOT SELECTED (4) | MAIN (1) | SUB (2) |

1350

TERMINAL APPARATUS AND DIVERSITY ANTENNA CONTROL METHOD FOR THE SAME

CROSS-REFERENCE TO RELATED APPLICATIONS

This application is based upon and claims the benefit of priority of the prior Japanese Patent Application No. 2008-167390, filed on Jun. 26, 2008, the entire contents of which are incorporated herein by reference.

FIELD

The embodiments disclosed herein are directed to a terminal apparatus equipped with a plurality of antennas and adapted to receive a wireless signal by antenna diversity, and a diversity antenna control method for the same.

BACKGROUND

Conventionally, personal computers (PCs), i.e., notebook PCs or laptop PCs have been used by placing them on desks. It has therefore been possible to obtain satisfactory antenna performance by mounting an antenna 102 above a liquid crystal display (LCD) 104 as illustrated in FIG. 1A.

In recent years, tablet PCs, such as the one illustrated in FIG. 1B, have been introduced into the market. The tablet PC is held by hand when in use. In this case, when the user's hand is placed in contact with the mounting portion of the antenna 102, the antenna performance drops. Further, when the user tilts the PC when in use, the antenna performance drops.

Similar problems also occur with notebook PCs as size reductions are made. On the other hand, a convertible PC having a 180-degree rotatable LCD and transformable from a notebook to a tablet PC and vice versa has been introduced into the market. Antenna performance degradation also becomes a problem with the convertible PC.

One possible approach to addressing the problem of antenna performance degradation is to mount a plurality of antennas 102 as diversity antennas, as illustrated in FIGS. 2A and 2B, and to receive data from one of the antennas that provides the best performance. By providing, for example, as many receive circuits as there are antennas and by detecting the received signal strength from each antenna and selecting the appropriate receive circuit, good communication quality can be maintained (refer, for example, to patent documents 1 and 2 listed below). However, the cost increases because this configuration requires the provision of as many receive circuits as there are antennas.

Another possible approach, which eliminates the need to provide as many receive circuits as the number of antennas, is to sequentially select the antennas for connection to the receive circuit and detect the received signal strength from each antenna (refer, for example, to patent documents 3 to 5 listed below). However, in this configuration, it takes time to select the receiving antenna because switching has to be made from one antenna to another in sequence.

Patent document 1: Japanese Unexamined Patent Publication No. 2006-245801
Patent document 2: Japanese Unexamined Patent Publication No. 2007-235305
Patent document 3: Japanese Unexamined Patent Publication No. 2005-142866
Patent document 4: Japanese Unexamined Patent Publication No. 2005-130175
Patent document 5: Japanese Unexamined Patent Publication No. H11-150490

SUMMARY

According to one aspect of the art disclosed herein, a terminal apparatus which is adapted to receive a wireless signal by antenna diversity includes: a mode-of-use detection unit which detects the mode of use of the terminal apparatus as set up by a user; a storage unit for storing priority information that predefines an antenna to be selected for use by prioritizing a plurality of antennas according to the mode of use that can be detected by the mode-of-use detection unit; a control unit which outputs selection control information specifying at least one antenna from among the plurality of antennas by comparing the mode of use detected by the mode-of-use detection unit with the priority information stored in the storage unit; and a selector which connects the antenna specified by the selection control information to a receive circuit provided at a subsequent stage.

According to another aspect of the art disclosed herein, there are provided a diversity antenna control methods to be implemented in the above terminal apparatus, and a recording medium having a program recorded thereon for causing a computer as the terminal apparatus to implement the method.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3A illustrates an external view of a notebook PC according to the present disclosure, and FIG. 3B illustrates an external view of a tablet PC according to the present disclosure.

FIG. 5A illustrates an external view, FIG. 5B illustrates the arrangement of antennas and sensors, FIG. 5C illustrates a tilt sensor, and FIG. 5D illustrates the apparatus in a tilted position.

FIG. 7 is a diagram illustrating the contents of a data table according to the first embodiment.

FIG. 10 is a diagram illustrating the contents of a data table according to the second embodiment.

FIG. 12A illustrates an external view of the apparatus when used as a notebook PC, and FIG. 12B illustrates an external view of the apparatus when used as a tablet PC.

FIG. 14 is a diagram illustrating the contents of a data table according to the third embodiment.

DESCRIPTION OF EMBODIMENTS

The preferred embodiments of the present invention will be explained with reference to the accompanying drawings.

Figure 1A:
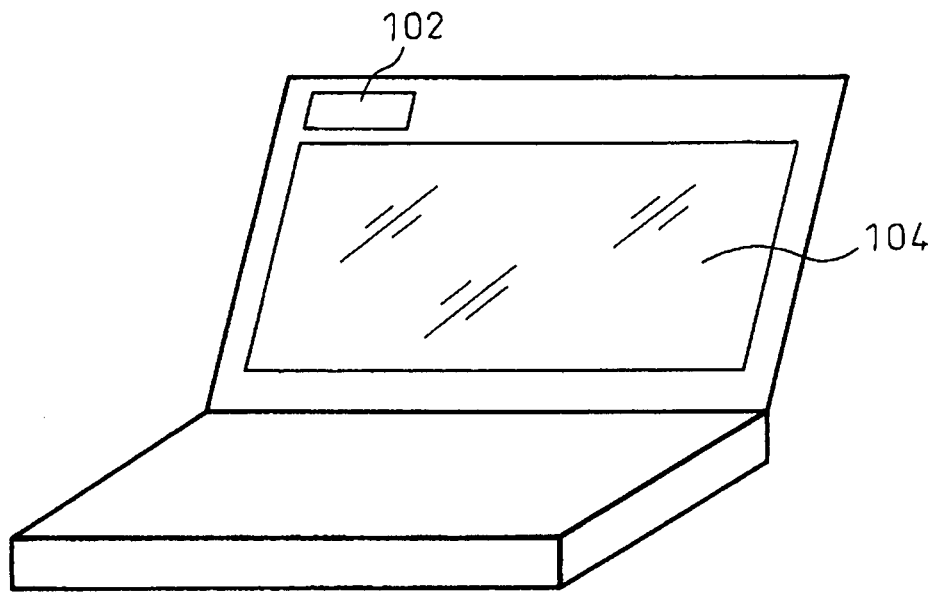
FIG. 1A is a diagram illustrating a notebook (laptop) personal computer (PC)
Figure 1B:
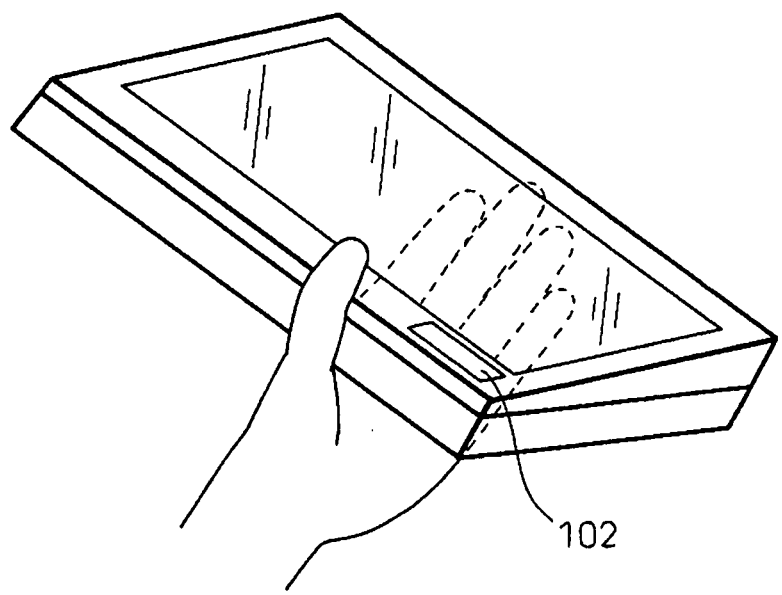
FIG. 1B is a diagram illustrating a tablet PC.
Figure 2A:
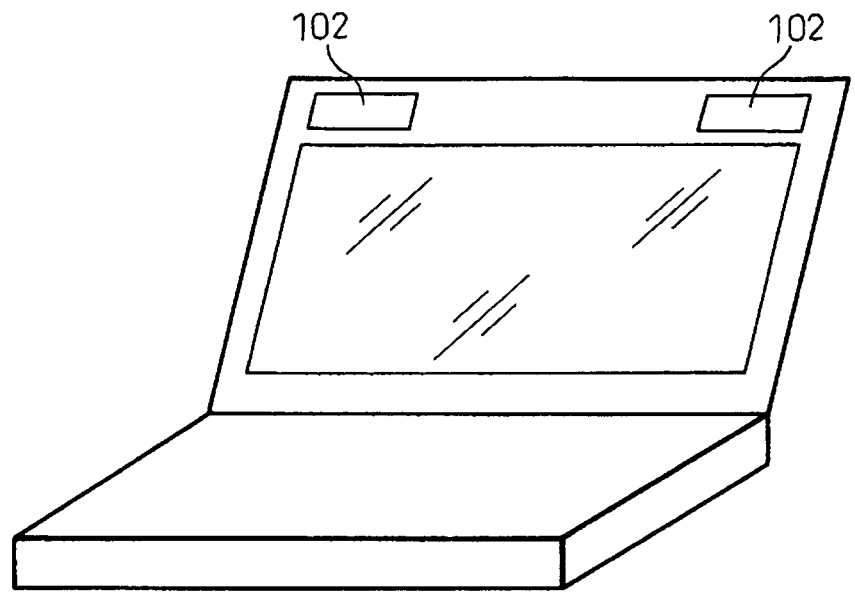
FIG. 2A is a diagram illustrating a notebook PC equipped with diversity antennas.
Figure 2B:
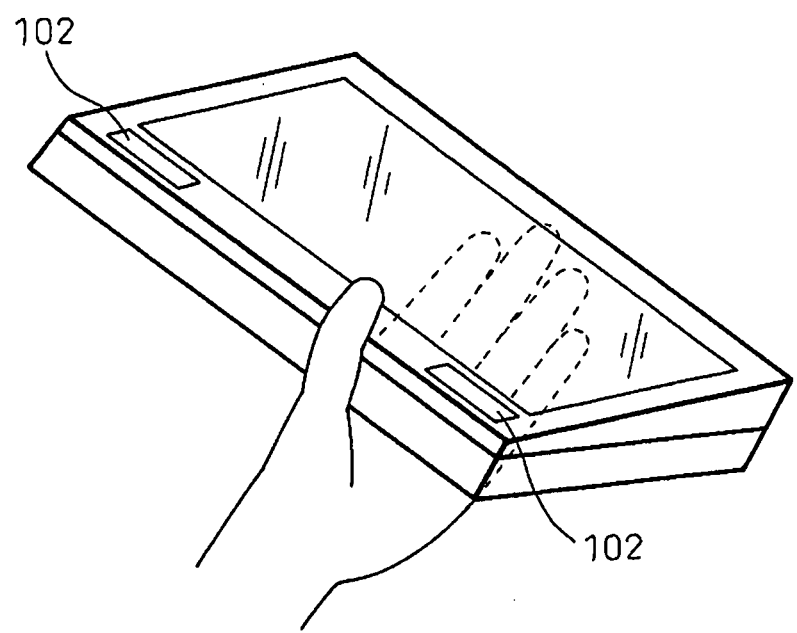
FIG. 2B is a diagram illustrating a tablet PC equipped with diversity antennas.
Figure 3A:
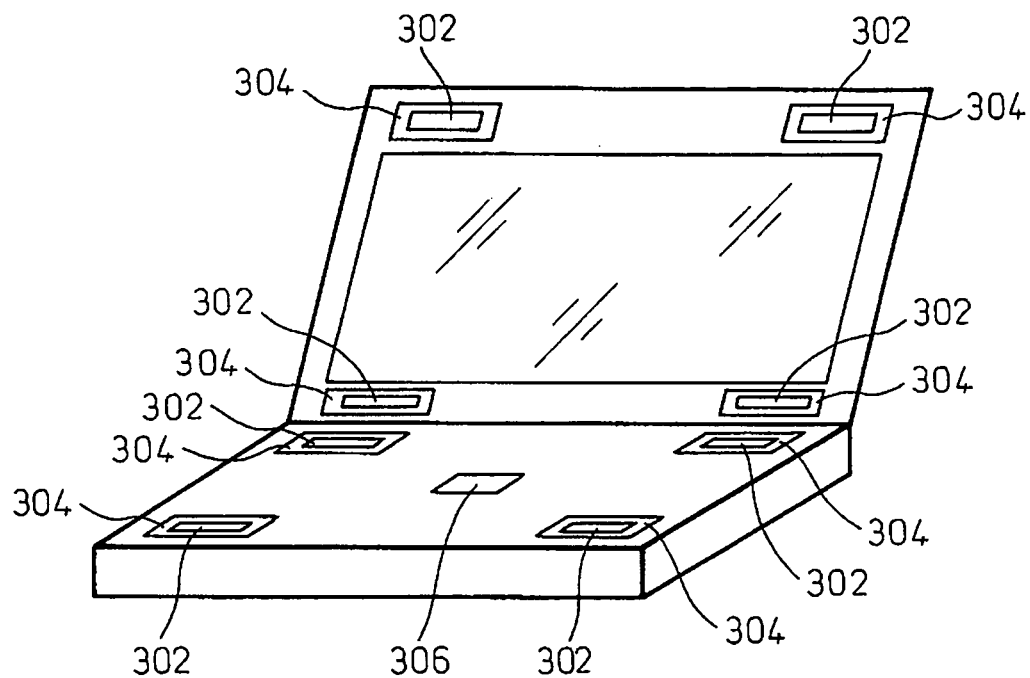
FIGS. 3A and 3B are diagrams explaining the basic functional mode of a terminal apparatus according to the present disclosure.
Figure 3B:
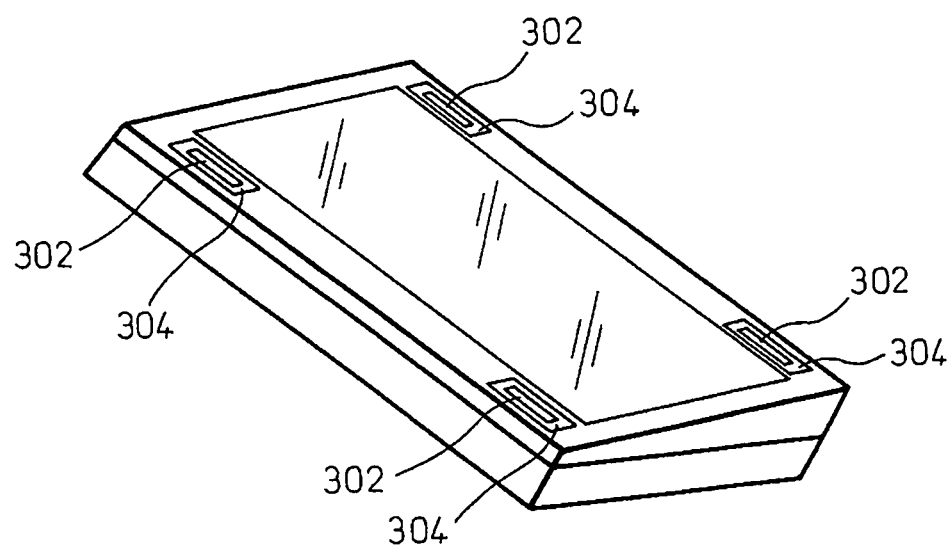

FIGS. 3A and 3B are diagrams for explaining the basic functional mode of a terminal apparatus according to the present disclosure: FIG. 3A illustrates an external view of a notebook PC according to the present disclosure, and FIG. 3B illustrates an external view of a tablet PC according to the present disclosure. The notebook PC illustrated in FIG. 3A is equipped with a plurality of antennas 302, and receives a wireless signal by antenna diversity.

The notebook PC includes contact sensors 304, one for each antenna 302, for sensing contact near the mounting portions of the respective antennas. The notebook PC further includes a tilt sensor for sensing tilting of the PC relative to the horizontal plane. Likewise, the tablet PC illustrated in FIG. 3B includes a plurality of antennas 302 and a plurality of contact sensors 304. FIGS. 3A and 3B are also diagrams illustrating a single convertible PC having a 180-degree rotatable LCD and transformable from a notebook to a tablet PC and vice versa.

Figure 4:
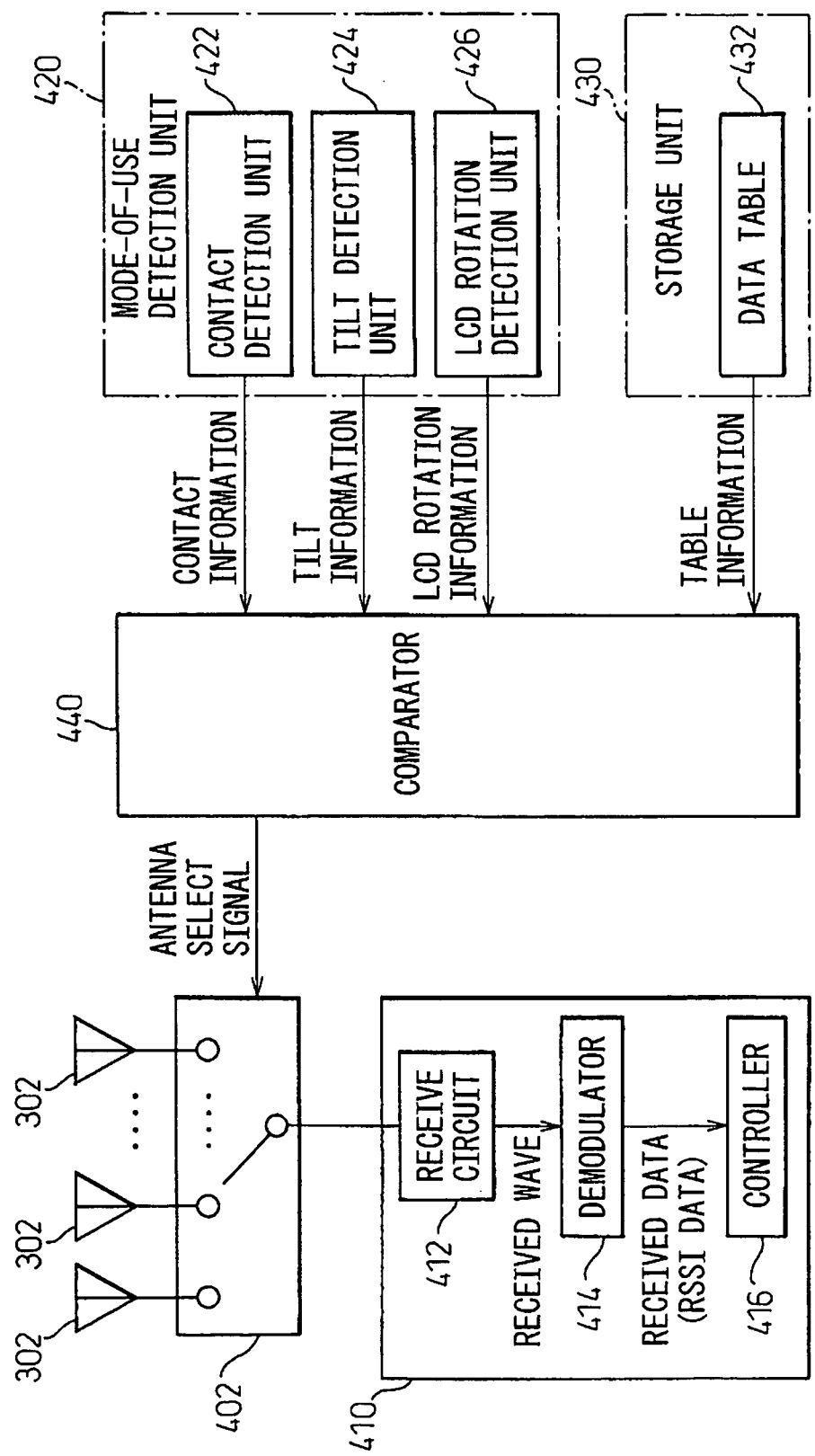
FIG. 4 is a diagram illustrating the configuration of a wireless receiver according to the basic functional mode.

FIG. 4 is a diagram illustrating the configuration of a wireless receiver according to the basic functional mode illustrated in FIGS. 3A and 3B. The wireless receiver comprises a plurality of antennas 302, an antenna selector 402, a communication module 410, a mode-of-use detection unit 420, a storage unit 430, and a comparator 440. The antenna selector 402 selects one antenna 302 based on an antenna select signal from the comparator 440 for connection to the communication module 410. The communication module 410 includes a receive circuit 412 for receiving a signal from the selected antenna 302, a demodulator 414 for demodulating the received wave from the receive circuit, and a controller 416 for receiving the received data and RSSI (Received Signal Strength Indicator) from the demodulator.

The mode-of-use detection unit 420 includes a contact detection unit 422 constructed from the plurality of contact sensors 304 illustrated in FIGS. 3A and 3B, a tilt detection unit 424 constructed from the tilt sensor 306 illustrated in FIGS. 3A and 3B, and an LCD rotation detection unit 426. When the LCD is 180-degree rotatable in swiveling fashion so that the terminal apparatus can be used not only as a notebook PC but also as a tablet PC, the LCD rotation detection unit 426 detects the swiveling rotation of the LCD and outputs LCD rotation information that indicates in which mode, a notebook mode or a tablet mode, the terminal apparatus is currently used.

The storage unit 430 stores a data table (priority information) 432 which predefines the antenna to be selected for use by prioritizing the antennas according to the mode of use that can be detected by the mode-of-use detection unit 420. The comparator 440 as a control unit compares the contact information, tilt information, LCD rotation information, etc. from the mode-of-use detection unit 420 with the table information from the data table 432, determines the antenna that best suits the current mode of use of the apparatus as set up by the user, and supplies the antenna select signal as selection control information to the antenna selector 402. The comparator 440 includes a memory into which a program is loaded, and a processor which executes the program loaded into the memory. Specific embodiments will be described in detail below.

Figure 5A:
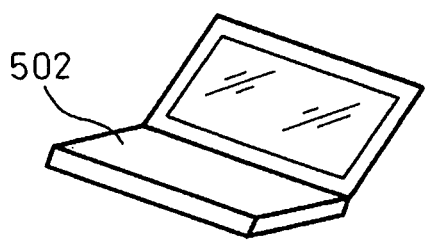
FIGS. 5A to 5D are diagrams explaining a first embodiment of the terminal apparatus according to the present disclosure.
Figure 5B:
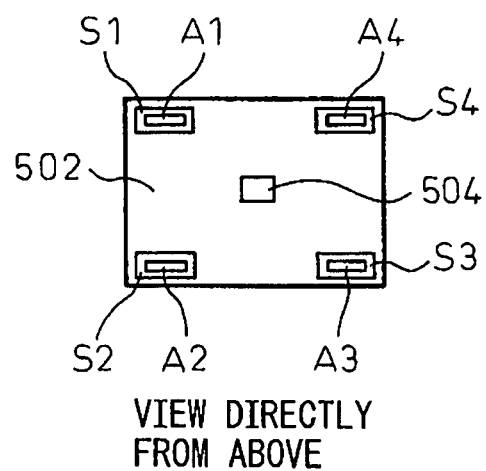
Figure 5C:
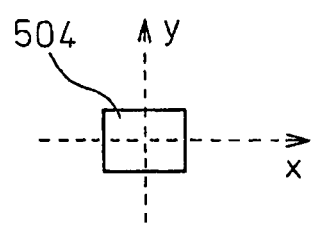
Figure 5D:
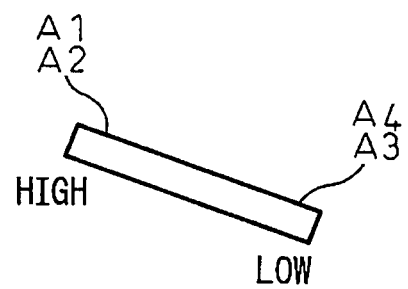

FIGS. 5A to 5D are diagrams for explaining a first embodiment of the terminal apparatus according to the present disclosure: FIG. 5A illustrates an external view, FIG. 5B illustrates the arrangement of antennas and sensors, FIG. 5C illustrates the tilt sensor, and FIG. 5D illustrates the apparatus in a tilted position. The portable terminal apparatus illustrated here is a notebook PC, as illustrated in FIG. 5A. As illustrated in FIG. 5B, the antennas A1 to A4 are mounted near the four corners of the operation panel 502 on which a keyboard, etc., are arranged. There are also mounted the contact sensors S1 to S4, one for each of the antennas A1 to A4, for sensing contact with the mounting portions of the respective antennas.

Further, the tilt sensor 504 is mounted near the center of the operation panel 502, as illustrated in FIG. 5B. The tilt sensor 504 is, for example, a piezoresistive three-axis acceleration sensor that can detect gravitational acceleration. This sensor detects gravitational acceleration components, ax and ay, respectively acting in the x-axis and y-axis directions parallel to the operation panel 502 and at right angles to each other. Since the positive values of ax, for example, indicate that the PC is tilted as illustrated in FIG. 5D, relative height information for the respective antenna A1 to A4 can be obtained.

Figure 6:
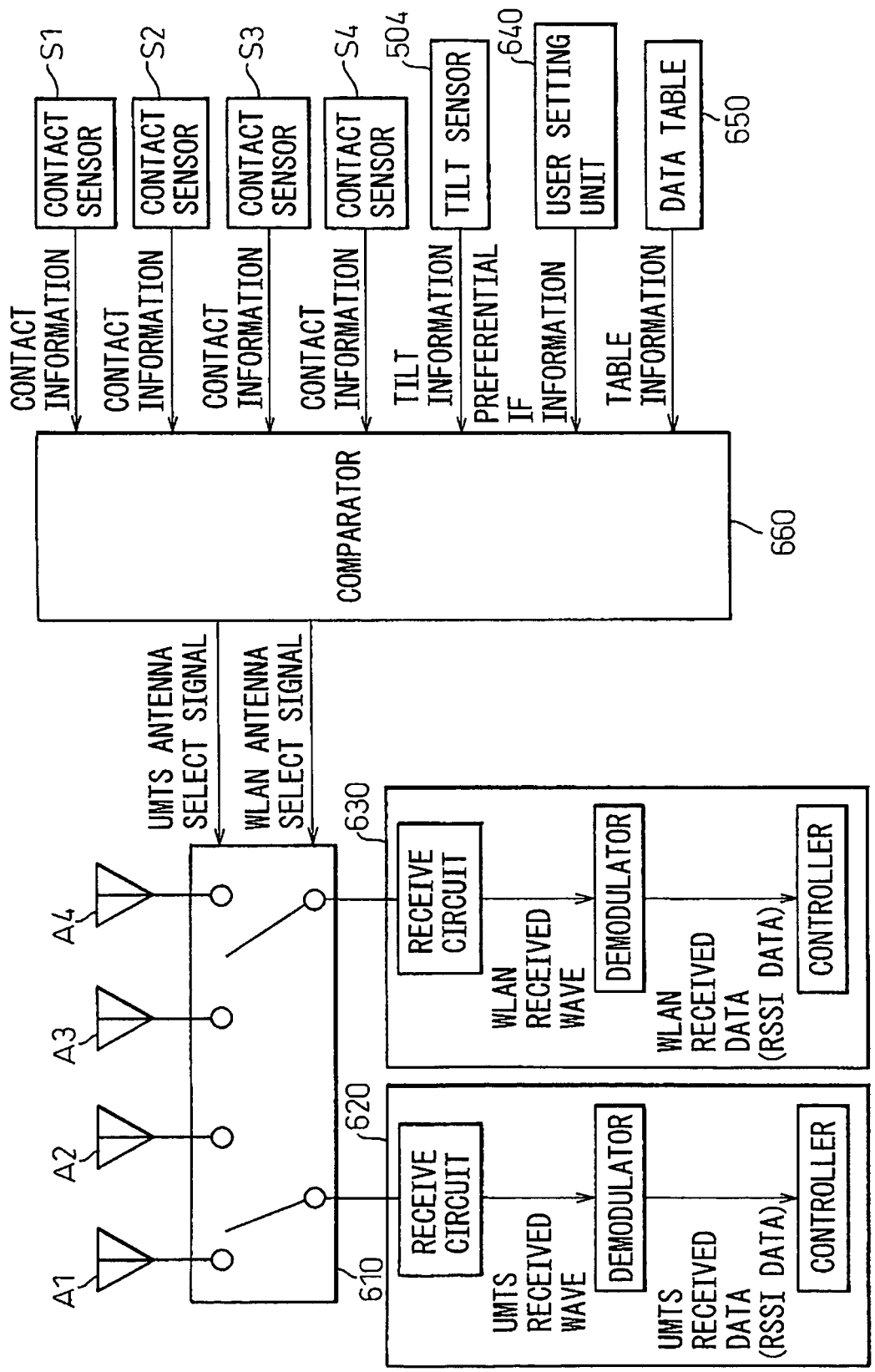
FIG. 6 is a diagram illustrating the configuration of a wireless receiver according to the first embodiment.

FIG. 6 is a diagram illustrating the configuration of a wireless receiver according to the first embodiment depicted in FIG. 5. The antennas A1 to A4 are each an integrated antenna designed for both UMTS (Universal Mobile Telecommunication System) and WLAN (Wireless LAN). Examples of integrated antennas include those that support some of the communication systems selected from among UMTS, WLAN, WiMAX (Worldwide Interoperability for Microwave Access), BT (British Telecommunications), UWB (Ultra Wide Band), etc.

The wireless receiver includes a UMTS module 620 and a WLAN module 630 as communication modules. An antenna selector 610 selects one antenna based on a UMTS antenna select signal from a comparator 660 for connection to the UMTS module 620, and selects another antenna based on a WLAN antenna select signal from the comparator 660 for connection to the WLAN module 630.

The comparator 660 compares the contact information from the contact sensors S1 to S4, tilt information from the tilt sensor 504, and preferential interface (IF) information from a user setting unit 640 with the table information from a data table 650, determines the antennas that best suit the current mode of use of the apparatus as set up by the user, and supplies the UMTS antenna select signal and WLAN antenna select signal to the antenna selector 610. In this embodiment, the user can make a setting, through the user setting unit 640, as to which IFs, UMTS or WLAN, is to be set as the preferential IF.

FIG. 7 is a diagram illustrating the contents of the data table 650 of FIG. 6. In the data table 650, the priorities of the antennas A1 to A4 are determined based on the contact information from the contact sensors S1 to S4 and the tilt information from the tilt sensor 504. Then, based on the user-set preferential IF information, either the highest priority antenna or the second highest priority antenna is set as the UMTS antenna and the other as the WLAN antenna.

The contact information indicates the presence or absence of contact with each antenna. The tilt information indicates whether the value of the x-axis component, ax, of the gravitational acceleration is positive or negative, whether the value of the y-axis component, ay, of the gravitational acceleration is positive or negative, and whether or not |ax| is larger than or equal to a given value d. The criterion |ax|≥d is used to determine in which direction, the x-axis direction or the y-axis direction, the apparatus is substantially tilted. Since the sum of the squares of the three-axis acceleration components is equal to the square of the gravitational acceleration (constant value), and the value of |ay| is limited by the value of |ax|, account need not be taken of |ay|.

When determining the priorities of the antennas A1 to A4, first the antennas A1 to A4 are divided into two groups based on whether contact is detected or not, in such a manner that any antenna where contact is detected belongs to the lower priority group while, on the other hand, any antenna where contact is not detected belongs to the higher priority group. Then, the priorities are finally determined based on the tilt information so that an antenna located at a higher position is given a higher priority. Lastly, the antennas to be used are determined based on the user-set preferential IF information, as earlier described.

For example, suppose that, in the condition illustrated in FIGS. 5A and 5B, contact is detected by the contact sensors S2 and S3 and the apparatus is tilted in such a manner that the height decreases in the x-axis and y-axis directions, the degree of tilting being greater in the x-axis direction, and suppose that UMTS is set as the preferential IF; in this case, antenna priority is given in the order of A1, A4, A2, and A3, so that the antenna A1 is selected as the UMTS antenna and the antenna A4 as the WLAN antenna.

Figure 8:
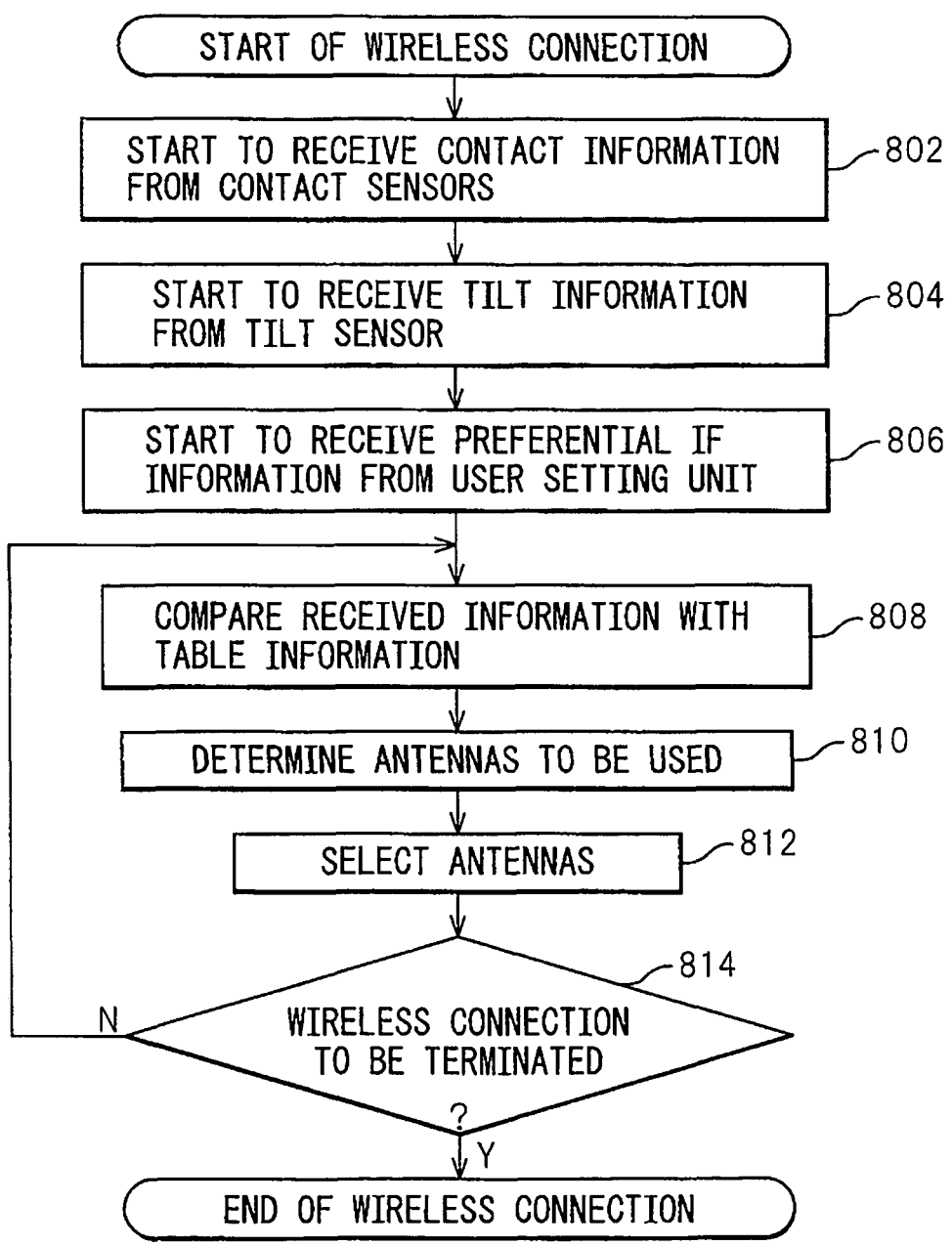
FIG. 8 is a flowchart of a wireless connection process according to the first embodiment.

FIG. 8 is a flowchart of a wireless connection process according to the first embodiment. When a wireless connection is started, the comparator 660 starts to receive the contact information from the contact sensors S1 to S4 (step 802). Next, the comparator 660 starts to receive the tilt sensor from the tilt sensor 504 (step 804). Next, the comparator 660 starts to receive the preferential IF information from the user setting unit 640 (step 806).

Then, the comparator 660 compares the information received in the above steps with the table information supplied from the data table 650 (step 808). Based on the results of the comparisons, the comparator 660 determines the antennas to be used, and outputs the UMTS antenna select signal and WLAN antenna select signal (step 810). In response to the select signals, the antenna selector 610 selects the respective antennas (step 812). Next, the comparator 660 determines whether the wireless connection is to be terminated (step 814); if the wireless connection is to be continued, the process returns to step 808.

Figure 9:
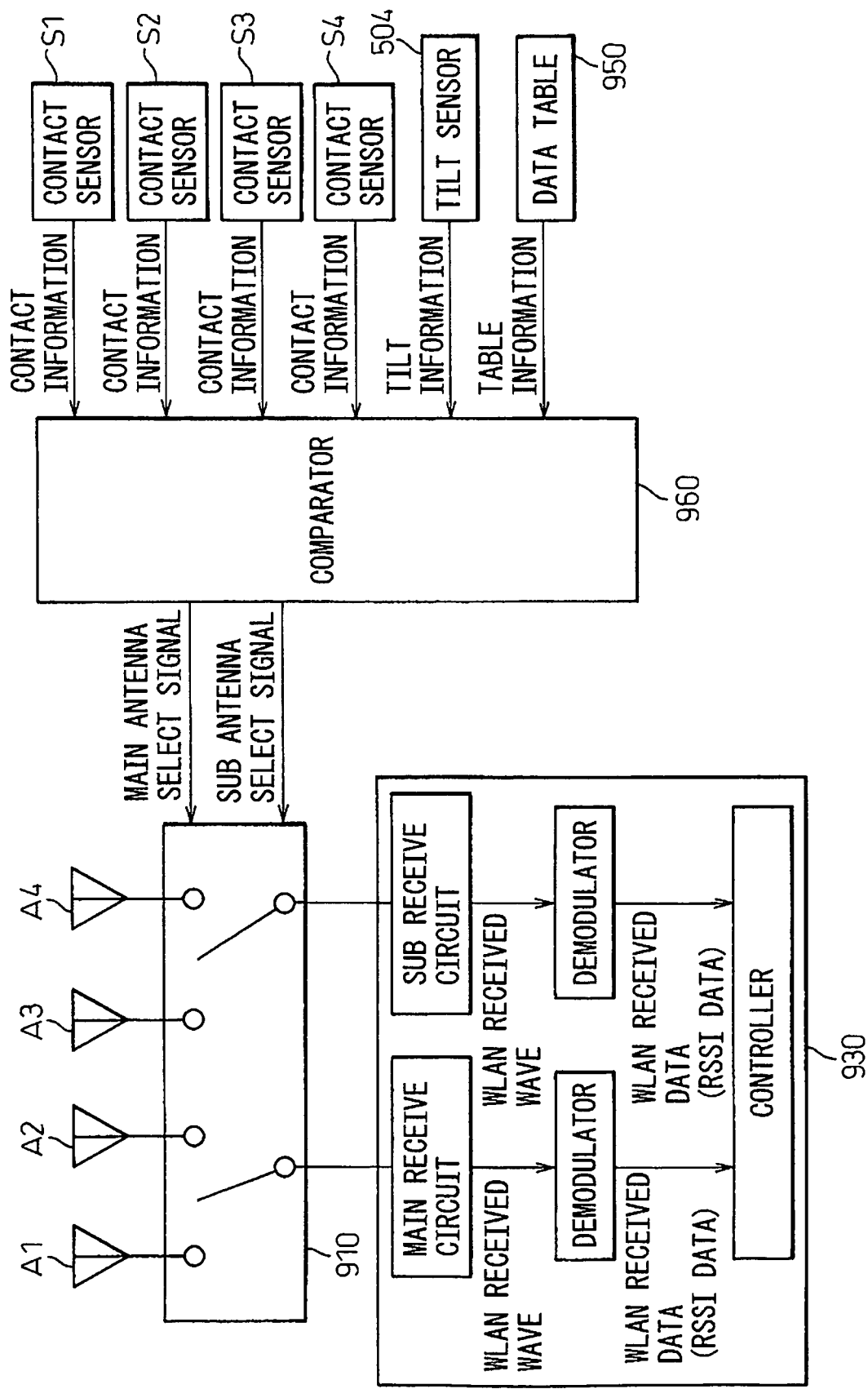
FIG. 9 is a diagram illustrating the configuration of a radio receiver in a second embodiment of the terminal apparatus according to the present disclosure.

FIG. 9 is a diagram illustrating the configuration of a radio receiver in a second embodiment of the terminal apparatus according to the present disclosure. The second embodiment also is a notebook PC and is equipped with antennas A1 to A4, contact sensors S1 and S4, and tilt sensor 504, as in the first embodiment illustrated in FIGS. 5A and 5B. However, the antennas A1 to A4 in the second embodiment are single-purpose antennas, i.e., WLAN antennas. The wireless receiver of the second embodiment includes a WLAN module 930 as a communication module, which includes a main receive circuit and a sub receive circuit.

Based on the main antenna select signal and sub antenna select signal from a comparator 960, an antenna selector 910 selects the corresponding antennas for connection to the main receive circuit and the sub receive circuit, respectively, in the WLAN module 930. The comparator 960 compares the contact information from the contact sensors S1 to S4 and the tilt information from the tilt sensor 504 with the table information from a data table 950, determines the antennas that best suit the current mode of use of the apparatus as set up by the user, and supplies the main antenna select signal and sub antenna select signal to the antenna selector 910.

FIG. 10 is a diagram illustrating the contents of the data table 950 of FIG. 9. In the data table 950, as in the data table of the first embodiment (FIG. 7), the priorities of the antennas A1 to A4 are determined based on the contact information from the contact sensors S1 to S4 and the tilt information from the tilt sensor 504. The highest priority antenna is then specified as the main antenna and the second highest priority antenna as the sub antenna.

Figure 11:
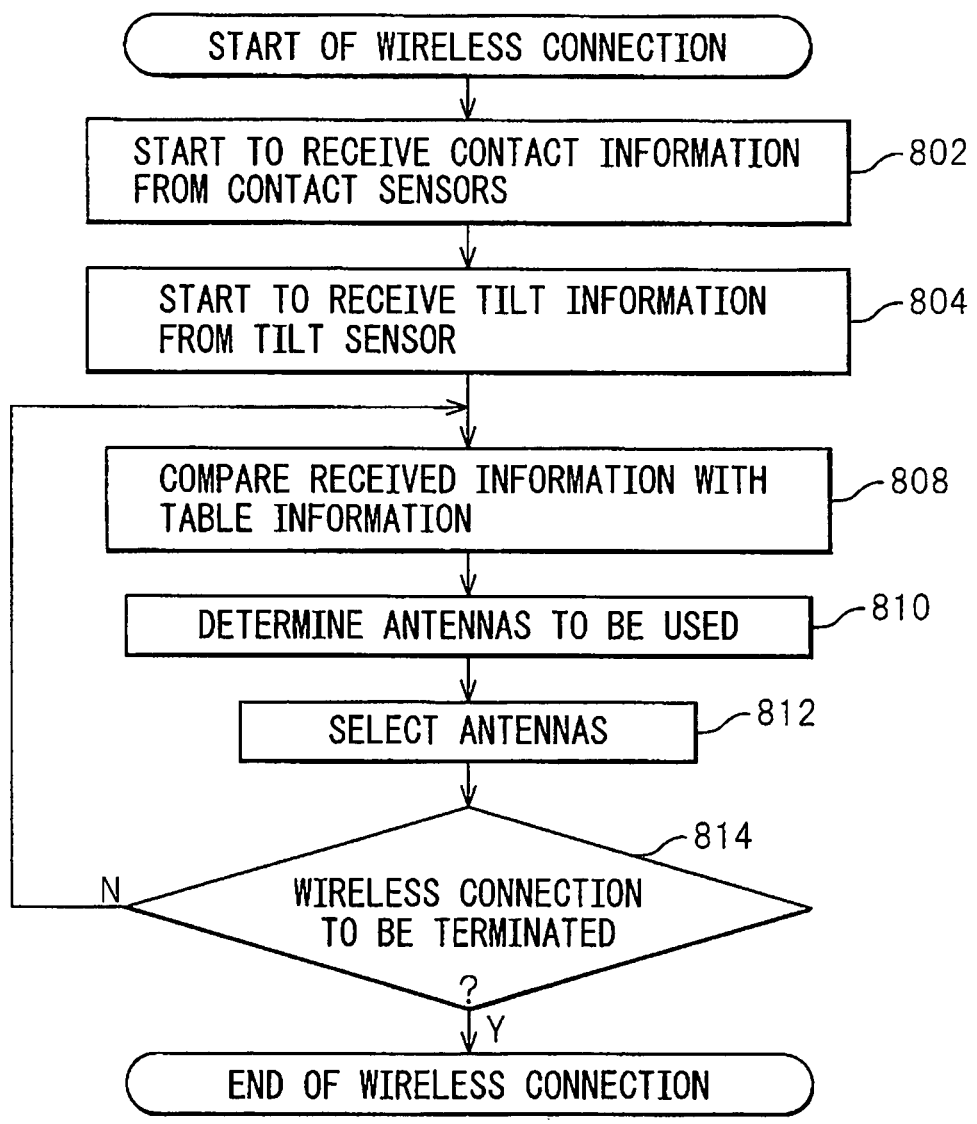
FIG. 11 is a flowchart of a wireless connection process according to the second embodiment.

FIG. 11 is a flowchart of a wireless connection process according to the second embodiment. This wireless connection process differs from the wireless connection process of the first embodiment (FIG. 8) only in that step 806 is deleted.

Figure 12A:
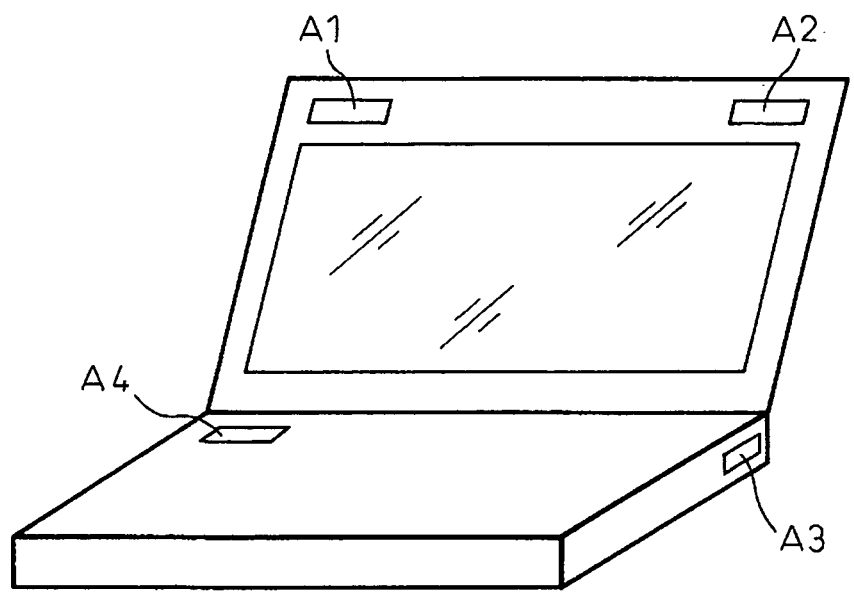
FIGS. 12A and 12B are diagrams explaining a third embodiment of the terminal apparatus according to the present disclosure.
Figure 12B:
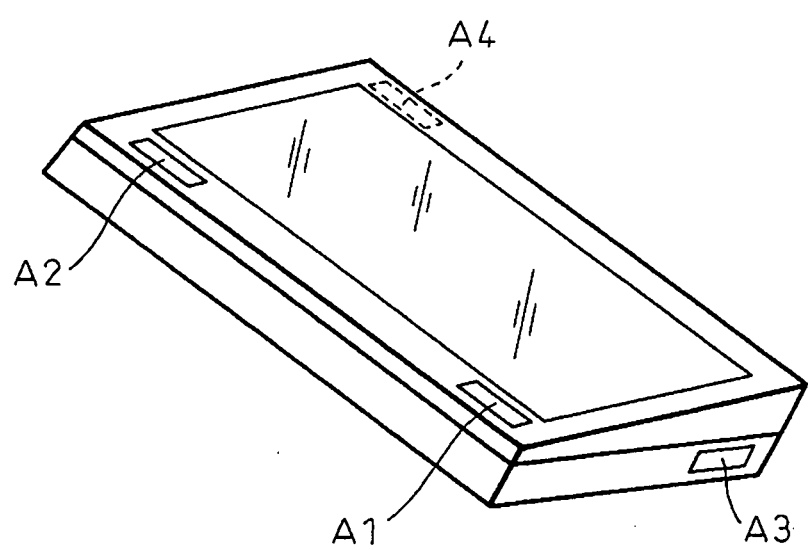

FIGS. 12A and 12B are diagrams for explaining a third embodiment of the terminal apparatus according to the present disclosure: FIG. 12B illustrates an external view of the apparatus when used as a notebook PC, and FIG. 12B illustrates an external view of the apparatus when used as a tablet PC. The portable terminal apparatus illustrated here is a convertible PC that can be used not only as a notebook PC as illustrated in FIG. 12A, but also as a tablet PC as illustrated in FIG. 12B.

This convertible PC is equipped with antennas A1 and A2 on the LCD side and antennas A3 and A4 on the operation panel side. Because of antenna directivity and antenna mounting structure, the antenna A1 has better characteristics than the antenna A2 and, between the antennas A3 and A4, the antenna A3 has the better characteristics.

Figure 13:
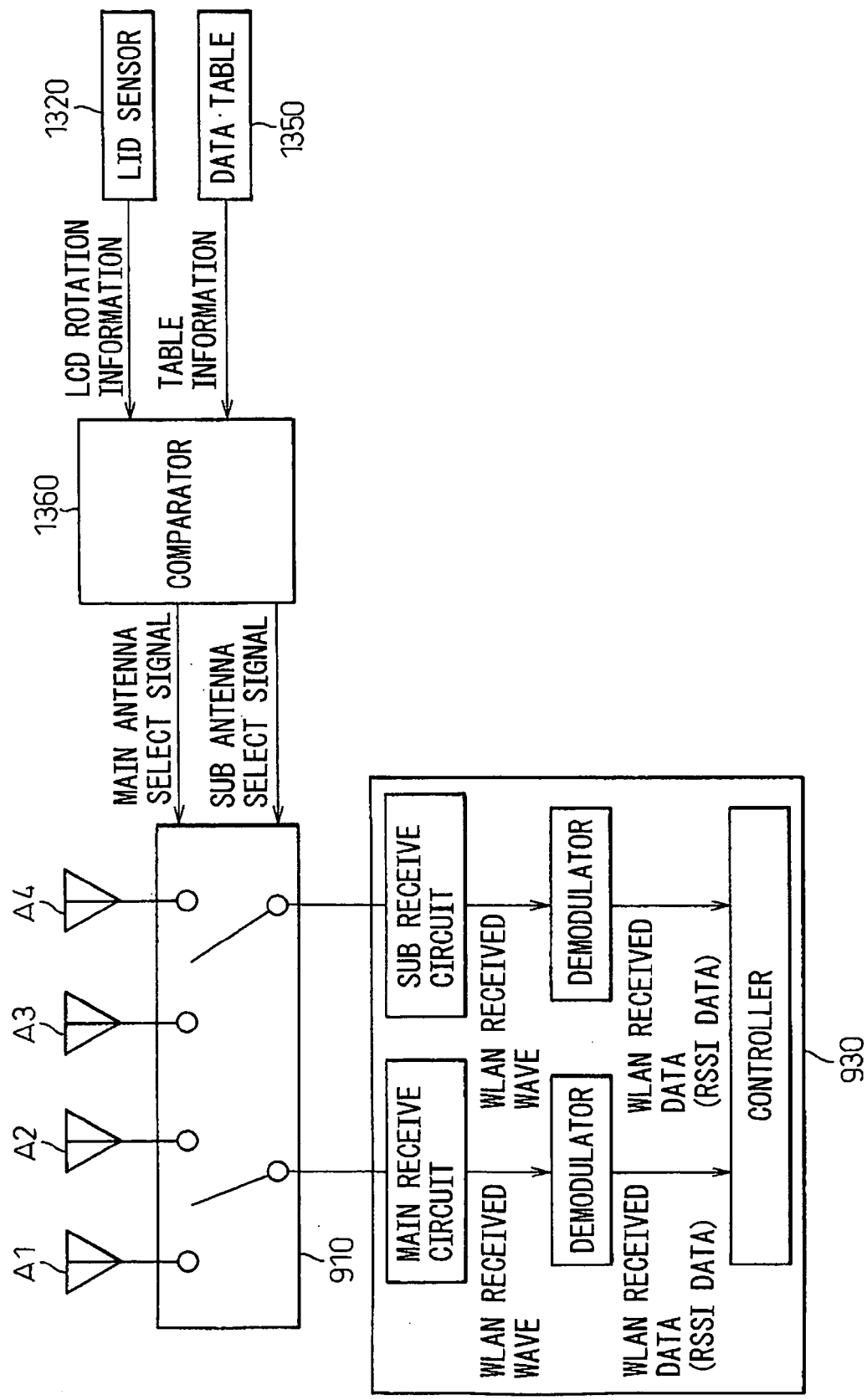
FIG. 13 is a diagram illustrating the configuration of a wireless receiver according to the third embodiment.

FIG. 13 is a diagram illustrating the configuration of a wireless receiver according to the third embodiment depicted in FIG. 12. The antenna selector 910 and WLAN module 930 in FIG. 12 are the same as those used in the second embodiment (FIG. 9). A comparator 1360 compares the LCD rotation information from a lid sensor 1320 with the table information from a data table 1350, determines the antennas that best suit the current mode of use of the apparatus as set up by the user, and supplies the main antenna select signal and sub antenna select signal to the antenna selector 910.

The lid sensor 1320 functions as the LCD rotation detection unit 426 illustrated in FIG. 4. In other words, when the LCD is 180-degree rotatable so that the terminal apparatus can be used not only as a notebook PC but also as a tablet PC, the lid sensor 1320 detects the rotation of the LCD magnetically and outputs the LCD rotation information that indicates in which mode, a notebook PC mode or a tablet PC mode, the terminal apparatus is currently used.

FIG. 14 is a diagram illustrating the contents of the data table 1350 of FIG. 13. In the data table 1350, the priorities of the antennas A1 to A4 are determined based on the LCD rotation information. That is, when the apparatus is set up for use as a notebook PC as illustrated in FIG. 12A, since the antennas A1 and A2 mounted on the LCD side have better reception characteristics than the antennas A3 and A4 mounted on the operation panel side, the antennas A1 and A2 are selected for use. Between the antennas A1 and A2, the antenna A1 is then selected as the main antenna for the reason described earlier. On the other hand, when the apparatus is set up for use as a tablet PC as illustrated in FIG. 12B, since the antennas A3 and A4 mounted on the operation panel side have better reception characteristics than the antennas A1 and A2 mounted on the LCD side, the antennas A3 and A4 are selected for use. Between the antennas A3 and A4, the antenna A3 is then selected as the main antenna for the reason described earlier.

Figure 15:
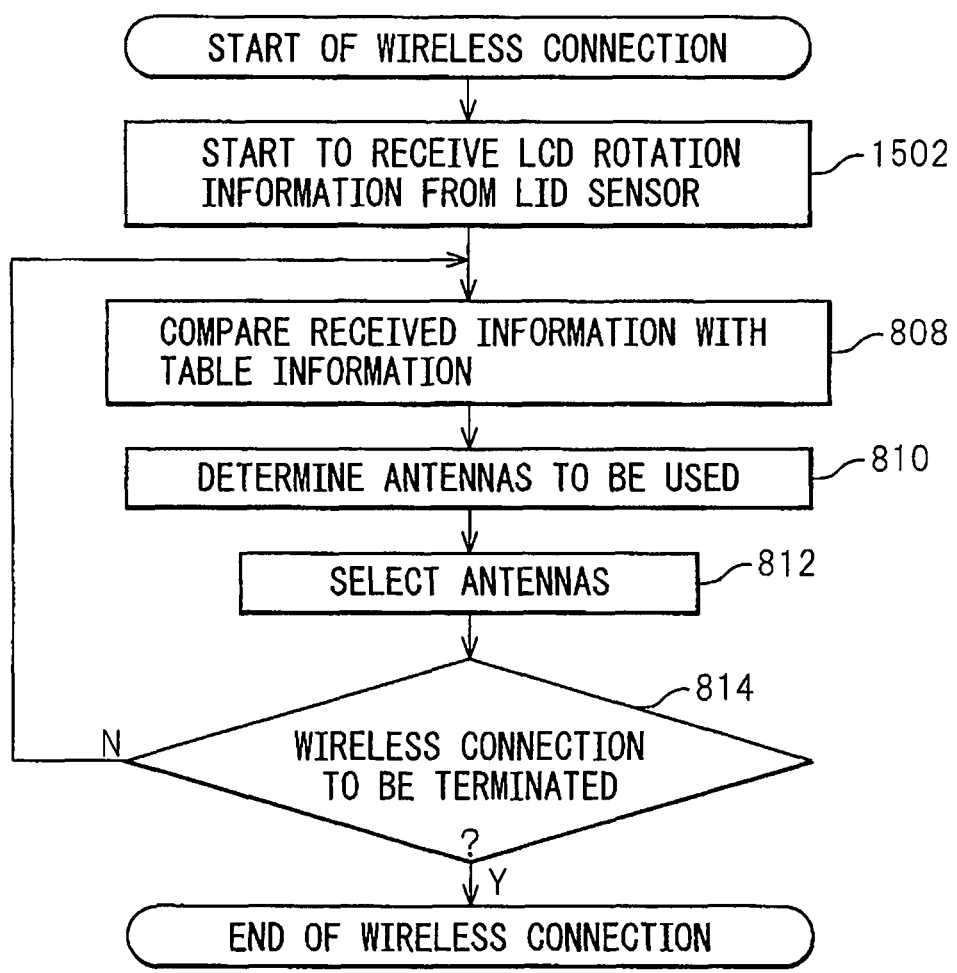
FIG. 15 is a flowchart of a wireless connection process according to the third embodiment.

FIG. 15 is a flowchart of a wireless connection process according to the third embodiment. This wireless connection process differs from the wireless connection process of the first embodiment (FIG. 8) only in that steps 802, 804, and 806 are replaced by step 1502. In step 1502, the comparator 1360 starts to receive the LCD rotation information from the lid sensor 1320. The subsequent steps are the same as those in the first embodiment.

Two or three of the first, second, and third embodiments described above may be combined for use.

According to the terminal apparatus and the diversity antenna control method disclosed herein, the antenna to be selected for use is uniquely determined based on the mode of use of the terminal apparatus as set up by the user, without having to detect the reception strength, and the antenna performance (reception sensitivity) is improved. Accordingly, a reduction in the number of receive circuits and a reduction in antenna selection time can be accomplished simultaneously. In particular, there is achieved an improvement in the wireless communication function of terminal apparatus that are expected to become increasingly popular in the future, such as tablet PCs and other portable terminal apparatus that are supposed to be used by being held by hand or in tilted position.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of superiority and inferiority of the invention. Although the embodiments of the present invention has been described in detail, it should be understood that the various changes, substitutions, and alternations could be made hereto without departing from the spirit and scope of the invention.

What is claimed is:

1. A terminal apparatus adapted to receive a wireless signal by antenna diversity using a plurality of antennas, comprising:
    a mode-of-use detection unit which detects mode of use of said terminal apparatus as set up by a user, the mode-of-use detection unit including
        a first sensing unit sensing contact near a mounting position of each of the plurality of antennas, and
        a second sensing unit sensing tilting of said terminal apparatus relative to a horizontal plane;
    a storage unit for storing priority information that predefines an antenna to be selected for use by prioritizing the plurality of antennas according to the mode of use that can be detected by said mode-of-use detection unit;
    a control unit which outputs selection control information specifying at least one antenna from among said plurality of antennas by comparing the mode of use detected by said mode-of-use detection unit with said priority information stored in said storage unit; and
    a selector which connects the antenna specified by said selection control information to a receive circuit provided at a subsequent stage.

2. A terminal apparatus as claimed in claim 1, wherein said priority information prioritizes said antennas in such a manner that any antenna where contact is detected is given lower selection priority than any antenna where contact is not detected.

3. A terminal apparatus as claimed in claim 2, wherein said priority information prioritizes said antennas in such a manner that any antenna judged from said tilting to be located at a higher position relative to the horizontal plane is given higher selection priority.

4. A terminal apparatus as claimed in claim 3,
    wherein said terminal apparatus includes receive circuits, one for each of a plurality of wireless types, and
    wherein said priority information defines the antenna to be selected for use for each wireless type in accordance with said selection priority and with wireless-type-specific priority set by the user.

5. A terminal apparatus as claimed in claim 3,
    wherein said terminal apparatus includes a main receive circuit and a sub receive circuit, and
    wherein said priority information defines the antenna to be selected for use for each of said main and sub receive circuits in accordance with said selection priority.

6. A terminal apparatus adapted to receive a wireless signal by antenna diversity using a plurality of antennas, comprising:
    a mode-of-use detection unit which detects a mode of use of said terminal apparatus as set up by a user, including whether the mode of use is a notebook mode or a tablet mode;
    a storage unit storing priority information that predefines an antenna to be selected for use by prioritizing the antennas in accordance with the mode of use that can be detected by said mode-of-use detection unit;
    a control unit which outputs selection control information specifying at least one antenna from among the plurality of antennas by comparing the mode of use detected by said mode-of-use detection unit with the priority information stored in said storage unit; and
    a selector which connects the at least one antenna specified by the selection control information to a receive circuit provided at a subsequent stage.

7. A diversity antenna control method for a terminal apparatus, comprising:
    detecting a mode of use of the terminal apparatus as set up by a user, including
        sensing one of presence and absence of contact near a mounting position of each of a plurality of antennas, and
        sensing tilting of the terminal apparatus relative to a horizontal plane;
    accessing a storage device in which is stored priority information that predefines an antenna to be selected for use by prioritizing the plurality of antennas according to the mode of use that can be detected by said detecting;
    outputting selection control information specifying at least one antenna from among the plurality of antennas by comparing the mode of use detected with the priority information stored in the storage device; and
    connecting the antenna specified by the selection control information to a receive circuit provided at a subsequent stage.

8. A diversity antenna control method as claimed in claim 7, wherein said priority information prioritizes said antennas in such a manner that any antenna where contact is detected is given lower selection priority than any antenna where contact is not detected.

9. A diversity antenna control method as claimed in claim 8, wherein the priority information prioritizes the antennas in such a manner that any antenna judged due to the tilting to be located at a higher position relative to the horizontal plane is given higher selection priority.

10. A diversity antenna control method as claimed in claim 9, wherein said terminal apparatus includes receive circuits one for each of a plurality of wireless types, and wherein said priority information defines the antenna to be selected for use for each wireless type in accordance with said selection priority and with wireless-type-specific priority set by the user.

11. A diversity antenna control method as claimed in claim 9, wherein said terminal apparatus includes a main receive circuit and a sub receive circuit, and wherein said priority information defines the antenna to be selected for use for each of said main and sub receive circuits in accordance with said selection priority.

12. A diversity antenna control method for a terminal apparatus, comprising:
  detecting a mode of use of the terminal apparatus as set up by a user, including whether the mode of use is a notebook mode or a tablet mode;
  accessing a storage device in which is stored priority information that predefines an antenna to be selected for use by prioritizing a plurality of antennas in accordance with the mode of use that can be detected by said detecting;
  outputting selection control information specifying at least one antenna from among the plurality of antennas by comparing the mode of use with the priority information stored in the storage device; and
  connecting the antenna specified by the selection control information to a receive circuit provided at a subsequent stage.

13. A computer readable recording medium having a program recorded thereon for causing a computer as a terminal apparatus to carry out a process to enable the terminal apparatus to receive a wireless signal by antenna diversity, said process comprising:
  detecting a mode of use of the terminal apparatus as set up by a user, the detecting including
    sensing the presence or absence of contact near a mounting position of each of said antennas, and
    sensing tilting of said terminal apparatus relative of a horizontal plane;
  accessing a storage device in which is stored priority information that predefines an antenna to be selected for use by prioritizing a plurality of antennas according to the mode of use that can be detected by said detecting;
  outputting selection control information specifying at least one antenna from among the plurality of antennas by comparing the mode of use detected with the priority information stored in the storage device; and
  connecting the antenna specified by the selection control information to a receive circuit provided at a subsequent stage.

14. A recording medium as claimed in claim 13, wherein the priority information prioritizes the antennas in such a manner that any antenna where contact is detected is given lower selection priority than any antenna where contact is not detected.

15. A recording medium as claimed in claim 14, wherein the priority information prioritizes the antennas in such a manner that any antenna judged due to the tilting to be located at a higher position relative to the horizontal plane is given higher selection priority.

16. A recording medium as claimed in claim 15, wherein said terminal apparatus includes receive circuits one for each of a plurality of wireless types, and wherein said priority information defines the antenna to be selected for use for each wireless type in accordance with said selection priority and with wireless-type-specific priority set by the user.

17. A recording medium as claimed in claim 15, wherein said terminal apparatus includes a main receive circuit and a sub receive circuit, and wherein said priority information defines the antenna to be selected for use for each of said main and sub receive circuits in accordance with said selection priority.

18. A computer readable recording medium having a program recorded thereon that when executed causes a computer as a terminal apparatus to carry out a process to enable the terminal apparatus to receive a wireless signal by antenna diversity, said process comprising:
  detecting a mode of use of the terminal apparatus as set up by a user, including whether the mode of use is a notebook mode or a tablet mode;
  accessing a storage device in which is stored priority information that predefines an antenna to be selected for use by prioritizing a plurality of antennas in accordance with the mode of use that can be detected by said detecting;
  outputting selection control information specifying at least one antenna from among the plurality of antennas by comparing the mode of use with the priority information stored in the storage device; and
  connecting the antenna specified by the selection control information to a receive circuit provided at a subsequent stage.

* * * * *